May 16, 1933.  G. H. DONALDSON  1,908,735

WEED REMOVING IMPLEMENT

Filed Nov. 29, 1932

INVENTOR
George H. Donaldson
by Harry R. Williams
Atty.

Patented May 16, 1933

1,908,735

UNITED STATES PATENT OFFICE

GEORGE H. DONALDSON, OF WEST HARTFORD, CONNECTICUT

WEED REMOVING IMPLEMENT

Application filed November 29, 1932. Serial No. 644,758.

This invention relates to an implement which is more especially designed for removing weeds from lawns and gardens, but which is also well adapted for use in planting and transporting plants, shrubs and vegetables.

The object of the invention is to provide a durable, light and inexpensive implement which, owing to its construction may, with but little effort, be used for the above mentioned purposes, and by means of which weeds that have long, deep growing roots, such as dandelion and dock, can be entirely removed from sod or gravel soil so they will not again spring up, without tearing or permanently injuring turf or making a large hole in the soil.

In attaining this object the implement has a blade that is much narrower at its bottom edge than at its top edge, and that has its side edges, which extend from the narrow bottom to the wide top, concaved on parabolic curves. On the back of the blade extending from the bottom edge toward the top along the curved side edges are ribs which not only strengthen the blade and reinforce its edges, but facilitate its entry into the ground when put to use. At the top of the blade is the usual frog and shank that receive the lower end of the handle of common form. Extending from the shank on each side along the top edge of the blade are foot pieces that at their outer ends have downturned ears.

Fig. 1 of the accompanying drawing shows a front view of the implement.

Figure 1:
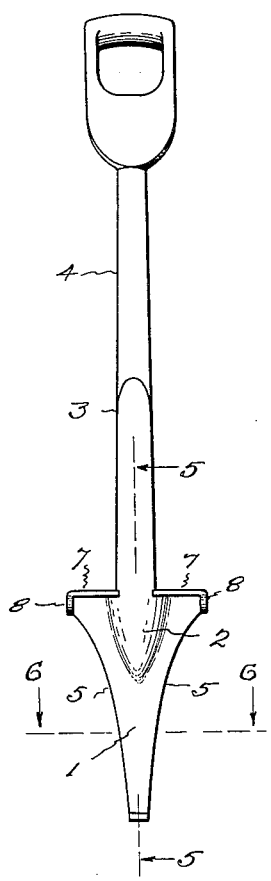
Figure 2:
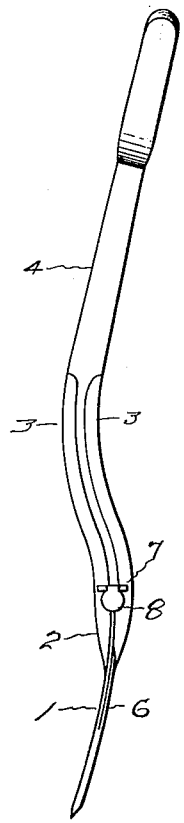
Fig. 2 shows a side view.
Figure 3:
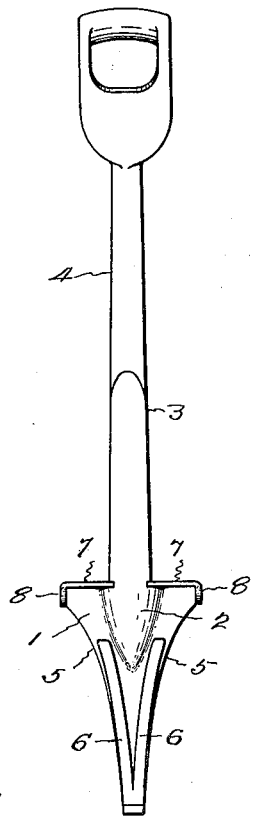
Fig. 3 shows a back view.
Figure 5:
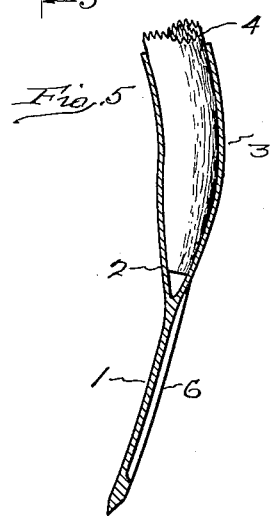
Fig. 5 is an enlarged longitudinal section taken on the plane indicated by the dotted line 5—5 on Fig. 1.
Figure 4:
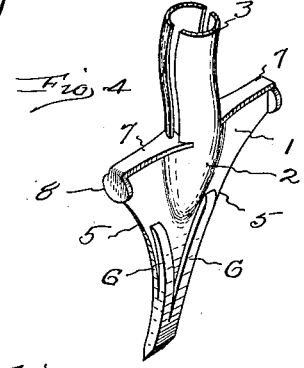
Fig. 4 is a perspective view of the blade with the ribs, frog, shank, foot pieces and ears.
Figure 6:
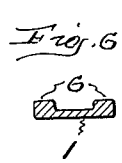
Fig. 6 shows a section on the plane indicated by the dotted line 6—6 on Fig. 1.

The blade 1 may be stamped or forged to shape of relatively thin sheet metal with an integral frog 2 at its upper end and the shanks 3 extending from the frog. The handle 4 which may be of common form has its lower end fitted into the curved shanks and down into the frog.

The side edges 5 of the blade from the narrow lower end to the wide upper end are concave, the curves preferably being parabolic. On the back of the blade and extending upward from the tip and along the side edges are ribs 6 which may be formed integral with the blade or welded thereto. The lower sections of these ribs conform to the side edges of the blade. At the top of the blade and extending outward from the shank are foot pieces 7 that at their outer ends have ears 8 which are turned down over the side edges of the top of the blade.

In using this implement for removing from sod a weed which is deeply rooted, cuts may be made on two diametrically opposite sides and then at the outer end of one cut the implement is forced into the ground at such an angle as to raise the sod and cause it to open along the cuts. The sod thus raised leaves the weed root free to be lifted from the opened cut, after which the sod may be pressed down by the foot of the user of the implement and as the sod has not been torn it returns to place without apparent scar. Weeds with less deep roots may be raised by one insertion of the implement turned edgewise so as to cut under the roots. A clump or bunch of weeds may be taken out by pushing the blade into the ground adjacent the roots and then prying and twisting the implement with a motion which loosens the roots so that they may be easily pulled out.

The blade being very narrow at the lower end goes into the ground easily and with less fatigue to the user and raises less sod when prying up under where the cut is made than an implement with a wide lower edge such as a spade, or an implement with convex curved edges. The width of the blade at the upper end provides against cutting into or damaging soft sod or soil at the back when the implement is manipulated for prying up roots. The implement although of light weight may be used for raising stones, and for grubbing for brush roots. The welded ribs on the back not only impart strength to the blade so that it will not bend when it is tipped for prying up an object, and also protect the edges from becoming bent or broken, but allow the blade to be made of thinner metal than usual, which, of course, makes the implement light and easy to handle. The ears at the ends of the foot pieces, bent over the sides of the blade at the top, not only strengthen the upper edge of the blade but they afford a resistance which prevents the top of the blade from cutting into soft soil when prying with an edge of the implement turned up.

The invention claimed is:

1. A weed removing implement comprising a blade formed of relatively thin sheet metal having a narrow lower edge and a wide upper edge, the side edges of the blade being formed on concave curves from the narrow lower edge to the wide upper edge, with projecting ribs on the back extending along the curved side edges of the blade from the lower end up, said blade having a frog, shank and a handle with its end inserted into the shank and frog, and foot pieces extending along the upper edge of the blade outwardly from the shank.

2. A weed removing implement comprising a blade formed of sheet metal having a narrow lower edge and a wide upper edge, the side edges of the blade being formed on concave curves from the narrow lower edge to the wide upper edge, said blade having a frog, shank and a handle with its end inserted into the shank and frog, and foot pieces extending outwardly from the shank each way along the upper edge of and permanently attached to the blade and having enlarged ears at their outer ends which are bent downward over the side edges of the blade.

3. A weed removing implement comprising a blade formed of sheet metal having a narrow lower edge and a wide upper edge, the side edges of the blade being formed on concave parabolic curves from the narrow lower edge to the wide upper edge, with projecting ribs on the back extending along the curved side edges part way up from the lower end, said blade having a frog, shank and a handle with its end inserted into the shank and frog, and foot pieces extending outwardly from the shank along the upper edge of the blade and having at their outer ends enlarged ears which are bent downward over the side edges of the blade.

GEORGE H. DONALDSON.